US009010643B2

(12) United States Patent
Madej et al.

(10) Patent No.: US 9,010,643 B2
(45) Date of Patent: Apr. 21, 2015

(54) SELECTIVE WORKING DISTANCE RANGE RESTRICTION IN IMAGING SYSTEM

(75) Inventors: Dariusz J. Madej, Shoreham, NY (US); Igor Vinogradov, Oakdale, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1241 days.

(21) Appl. No.: 12/290,797

(22) Filed: Nov. 4, 2008

(65) Prior Publication Data

US 2010/0108766 A1    May 6, 2010

(51) Int. Cl.
G06K 15/12    (2006.01)
G06K 7/10    (2006.01)
G06K 7/14    (2006.01)

(52) U.S. Cl.
CPC ........ G06K 7/10722 (2013.01); G06K 7/10792 (2013.01)

(58) Field of Classification Search
USPC ............... 235/454, 462.1, 462.41, 462.01, 235/472.01, 462.15
See application file for complete search history.

(56) References Cited

U.S. PATENT DOCUMENTS

| 4,613,895 | A | | 9/1986 | Burkey et al. |
|---|---|---|---|---|
| 4,684,792 | A | | 8/1987 | Nickels |
| 4,794,239 | A | | 12/1988 | Allais |
| 5,311,969 | A | | 5/1994 | Dickover et al. |
| 5,324,924 | A | * | 6/1994 | Cai et al. ................. 235/462.15 |
| 5,703,349 | A | | 12/1997 | Meyerson et al. |
| 5,874,719 | A | * | 2/1999 | Hippenmeyer et al. .. 235/462.01 |
| 6,021,944 | A | | 2/2000 | Arakaki |
| 6,021,946 | A | * | 2/2000 | Hippenmeyer et al. .. 235/462.22 |
| 6,276,606 | B1 | | 8/2001 | Liou et al. |
| 7,097,104 | B2 | * | 8/2006 | Silverbrook et al. .... 235/462.41 |
| 7,108,187 | B2 | | 9/2006 | Turvy, Jr. et al. |
| 7,303,131 | B2 | | 12/2007 | Carlson et al. |
| 7,347,371 | B2 | | 3/2008 | Joseph et al. |
| 7,389,923 | B2 | | 6/2008 | Blanford |
| 7,546,953 | B1 | | 6/2009 | Collins, Jr. |
| 7,644,865 | B2 | | 1/2010 | Barkan |

(Continued)

FOREIGN PATENT DOCUMENTS

WO    2008027170    3/2008
WO    2010053721    5/2010

OTHER PUBLICATIONS

International Search Report and Written Opinion dated Mar. 26, 2010 in related case PCT/US2009/061829.
International Preliminary Report on Patentability for International Application No. PCT/US2009/061829 mailed on May 19, 2011.
Non Final Office Action mailed Aug. 6, 2012 in U.S. Appl. No. 12/860,190, Miroslav Trajkovic, filed Aug. 20, 2010.

(Continued)

Primary Examiner — Thien T Mai
(74) Attorney, Agent, or Firm — Nong-Qiang Fan

(57) ABSTRACT

An imaging system for electro-optically reading a symbol located within a range of working distances from the system, utilizes a solid-state imager for capturing return light from the symbol and for generating an electrical signal indicative of the captured return light, and a controller for decoding the electrical signal into data indicative of the symbol A memory stores a known set of values for a plurality of optical characteristics of the symbol, such as size and contrast characteristics of the symbol when the symbol lies in a restricted zone within the range of working distances. The controller is operative, after the symbol has been successfully decoded, for processing the size and contrast characteristics of the decoded symbol, and for determining that the decoded symbol has been successfully read within the restricted zone when each size and contrast characteristic lies within the known set of values stored by the memory.

12 Claims, 4 Drawing Sheets

(56) References Cited

U.S. PATENT DOCUMENTS

| | | |
|---|---|---|
| 7,753,269 B2 | 7/2010 | Russell et al. |
| 8,245,926 B2 | 8/2012 | Guess et al. |
| 2003/0226893 A1* | 12/2003 | Okada et al. .................. 235/454 |
| 2006/0043187 A1 | 3/2006 | He et al. |
| 2006/0065732 A1* | 3/2006 | Barkan ......................... 235/454 |
| 2006/0163360 A1* | 7/2006 | Steusloff et al. ......... 235/472.02 |
| 2006/0192010 A1 | 8/2006 | Massieu |
| 2007/0034696 A1* | 2/2007 | Barkan et al. ............ 235/472.01 |
| 2007/0063048 A1 | 3/2007 | Havens et al. |
| 2007/0164115 A1 | 7/2007 | Joseph et al. |
| 2008/0054075 A1* | 3/2008 | Barkan ................... 235/462.01 |
| 2010/0019042 A1 | 1/2010 | Barkan |
| 2011/0309147 A1 | 12/2011 | Barkan et al. |
| 2012/0043385 A1 | 2/2012 | Trajkovic et al. |
| 2012/0181338 A1 | 7/2012 | Gao |
| 2014/0061308 A1 | 3/2014 | Madej et al. |

OTHER PUBLICATIONS

Final Office Action mailed Oct. 10, 2012 in U.S. Appl. No. 12/860,190, Miroslav Trajkovic, filed Aug. 20, 2010.

Parikh, D., and Jancke, G., "Localization and Segmentation of a 2D High Capacity Color Barcode," 7 pages, received Nov. 15, 2013.

International Search Report and Written Opinion for International Application No. PCT/US2013/055648 mailed on Oct. 24, 2013.

Non Final Office Action mailed Apr. 11, 2014 in U.S. Appl. No. 12/860,190, Miroslav Trajkovic, filed Aug. 20, 2010.

Office Action in counterpart Chinese Patent Application No. 200980144119.3, mailed on Mar. 26, 2013.

Office Action dated May 27, 2014 in counterpart China patent application 200980144119.3.

\* cited by examiner

SELECTIVE WORKING DISTANCE RANGE RESTRICTION IN IMAGING SYSTEM

DESCRIPTION OF THE RELATED ART

Solid-state imaging systems, in both handheld and hands-free modes of operation, have been used in supermarkets, warehouse clubs, department stores, and other kinds of retailers for many years, to electro-optically read targets, such as one-dimensional bar code symbols, particularly of the Universal Product Code (UPC) type, each having a row of bar elements and space elements spaced apart along a scan direction, of various densities, such as 100% UPC, 80% UPC and 60% UPC. The density of a symbol is characterized by a width dimension of a narrowest symbol element or module, e.g., a bar element or a space element, along the scan direction. In the case of the 100% UPC, 80% UPC and 60% UPC symbol densities, the module measures 13 mils, 10.4 mils and 7.8 mils, respectively.

The solid-state imaging system includes an imager having a one- or two-dimensional array of cells or photosensors, which correspond to image elements or pixels in a field of view of the imager, and a focusing lens assembly for capturing light front the symbol and projecting the captured light onto the imager. Such an imager may include a one- or two-dimensional charge coupled device (CCD) or a complementary metal oxide semiconductor (CMOS) device, and is analogous to the imager used in a digital consumer camera to capture images. The focusing lens assembly includes optical elements for capturing the light over a range of working distances in which the symbol can be read.

The imaging system further typically includes an illuminator to illuminate the symbol during its reading with illumination light emitted from an illumination light source and directed to the symbol for reflection and scattering as return light therefrom. The illumination light source may be located within and/or externally of the system, and typically comprises one or more light emitting diodes (LEDs). To assist an operator in reading a desired symbol, the imaging system is often equipped with an aiming assembly having an aiming laser for generating a laser beam, and aiming optics for generating a visible aiming pattern, such as a "crosshair" pattern, from the laser beam. The operator trains the aiming pattern on the symbol to be imaged during an aiming mode prior to reading. The system yet further includes electronic circuitry for processing electrical signals generated by the imager and indicative of the return light captured by the array, and a microprocessor for processing and decoding the electrical signals to read each captured image.

It is therefore known to use a solid-state imaging system for capturing a monochrome image of a symbol as, for example, disclosed in U.S. Pat. No. 5,703,349. It is also known to use a solid-state imaging system with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

In the hands-free mode, the operator may slide or swipe a product bearing a target symbol past a window of the system in either horizontal and/or vertical and/or diagonal directions, in a "swipe" mode. Alternatively, the operator may present the symbol on the product to an approximate central region of the window in a "presentation" mode. The choice depends on operator preference or on the layout of a workstation in which the system is used.

In the handheld mode, the operator holds the system in his or her hand during reading and aims the system at the target symbol to be read. The operator may first lift the system from a countertop or a support stand or cradle. Once reading is completed, the operator may return the system to the countertop or to the support stand to resume hands-free operation. A mode switch is typically provided on the system and/or on the support stand to configure the system in the appropriate handheld or hands-free mode.

Although the known imaging system is generally satisfactory for its intended purpose, one concern relates to the range of working distances in which the symbol can be read. For the handheld mode to be effective, the working distance range is typically designed to be long, for instance, many feet from the system. A long working distance range enables the operator to read a symbol located on a product that is either far from the handheld system, for instance, on a remote shelf, or is either too big, or too heavy, or too inconvenient to be brought to the handheld system.

However, if such a system with a long working distance range is placed on a countertop or on a support stand for hands-free operation, then the system can unintentionally read symbols on products that happen to be in the field of view. For example, it is not uncommon for a consumer to simultaneously dump many products to be purchased on a countertop in a retail point-of-sale environment, in which event, the system will at least try to read the symbols on all those products scattered around the countertop. Worse yet, the operator will not know which of the symbols have been read. It would be desirable to limit the long working distance range in such systems in the hands-free mode of operation.

SUMMARY OF THE INVENTION

One feature of the present invention resides, briefly stated, in an imaging system for, and a method of, electro-optically reading a target, such as a bar code symbol particularly of the Universal Product Code (UPC) type, located within a range of working distances from the system. The UPC symbol has a row of bar elements and space elements of different light reflectivity and spaced apart along a scan direction. The UPC symbol has various densities, such as 100% UPC, 80% UPC and 60% UPC. The density of a symbol is characterized by a width dimension of a narrowest symbol element or module, e.g., a bar element or a space element, along the scan direction. In the case of the 100% UPC, 80% UPC and 60% UPC symbol densities, the module measures 13 mils, 10.4 mils and 7.8 mils, respectively. The symbol has a plurality of optical characteristics, as described below, that vary with working distance.

The system includes a solid-state imager having an array of image sensors for capturing return light from the symbol over a field of view, preferably with the aid of a focusing lens assembly, and for generating an electrical signal indicative of the captured return light. Preferably, the array is a CCD or a CMOS array. The system also includes a controller or programmed microprocessor operative for decoding the electrical signal into data indicative of the symbol, and for determining that the symbol has been successfully decoded.

In accordance with one aspect of this invention, a memory is accessible to the controller, for storing a known set of values of the plurality of optical characteristics of the symbol when the symbol lies in a restricted zone within the range of working distances. The controller is further operative, after the symbol has been successfully decoded, for processing the plurality of optical characteristics of the decoded symbol, and for determining that the decoded symbol has been successfully read within the restricted zone when each processed optical characteristic lies within the known set of values stored by the memory.

One of the optical characteristics is a symbol element size characteristic. The controller is operative, in processing the symbol element size characteristic, for estimating how many of the sensors in the array capture the return light from a symbol element having the narrowest width dimension, i.e., the module. As the working distance from the system increases, the number of the sensors that capture the return light from the module decreases. Relying on just the size characteristics, however, is not enough to insure that the symbol is in the restricted zone, primarily because successive symbols being presented may be, and often are, of different densities.

Hence, another of the optical characteristics that is relied on is a contrast characteristic. The controller is operative, in processing the contrast characteristic, for estimating a contrast ratio of a first difference in brightness between symbol elements having the narrowest width dimension divided by a second difference in brightness between symbol elements having the widest width dimension. The contrast ratio is generally highest at an imaging plane at which the focusing lens assembly optimally focuses the return light onto the imager. The contrast ratio decreases in either direction away from the imaging plane.

The system has a housing having a window through which the return light passes. The restricted zone advantageously has a near subzone that preferably between the window and a working distance of about two inches from the window, and an intermediate subzone that preferably lies between the window and a working distance of about six inches from the window. The memory is operative for storing a near set of values for both the size characteristic and the contrast characteristic for the near subzone, and an intermediate set of values for both the size characteristic and the contrast characteristic for the intermediate subzone. The controller is operative, after the symbol has been successfully decoded, for determining that the decoded symbol has been successfully read within the near subzone when the size and contrast characteristics lie within the near set of values stored by the memory, and for determining that the decoded symbol has been successfully read within the intermediate subzone when the size and contrast characteristics lie within the intermediate set of values stored by the memory.

The controller is further operative for distinguishing between a handheld mode and a hands-free mode of operation of the system. The controller is operative for determining that the decoded symbol has been successfully read within the restricted zone when each processed optical characteristic lies within the known set of values stored by the memory in the hands-free mode of operation.

The method of electro-optically reading a symbol that is located within a range of working distances from a system, and that has a plurality of optical characteristics that vary with working distance, is performed by capturing return light from the symbol over a field of view of a solid-state imager having an array of image sensors, generating an electrical signal indicative of the captured return light, decoding the electrical signal into data indicative of the symbol, determining that the symbol has been successfully decoded, storing a known set of values of the plurality of optical characteristics of the symbol when the symbol lies in a restricted zone within the range of working distances, processing the plurality of optical characteristics of the symbol after the symbol has been successfully decoded, and determining that the decoded symbol has been successfully read within the restricted zone when each processed optical characteristic lies within the stored known set of values.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
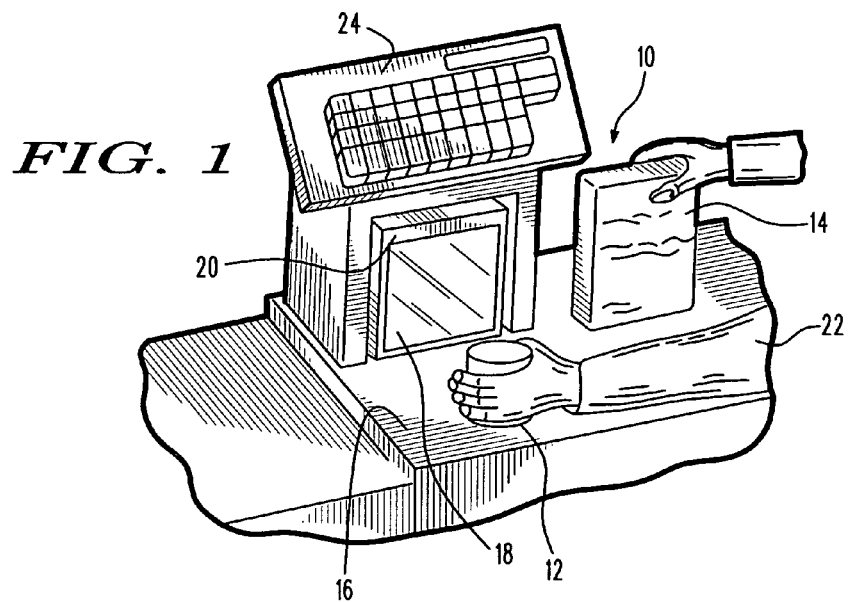
FIG. 1 is a perspective view of a portable imaging system operative in a workstation mode for capturing light from targets to be electro-optically read.

Reference numeral 10 in FIG. 1 generally identifies a workstation for processing transactions and specifically a checkout counter at a retail site at which products, such as a can 12 or a box 14, each bearing a target symbol, are processed for purchase. The counter includes a countertop 16 across which the products are slid at a swipe speed past, or presented to, a generally vertical or upright planar window 18 of a portable, box-shaped, vertical slot reader or imaging system 20 mounted on the countertop 16. A checkout clerk or operator 22 is located at one side of the countertop, and the imaging system 20 is located at the opposite side. A host or cash/credit register 24 is located within easy reach of the operator. The operator 22 call also hold the imaging system 20 in one's hand during imaging.

Figures 2, 3:
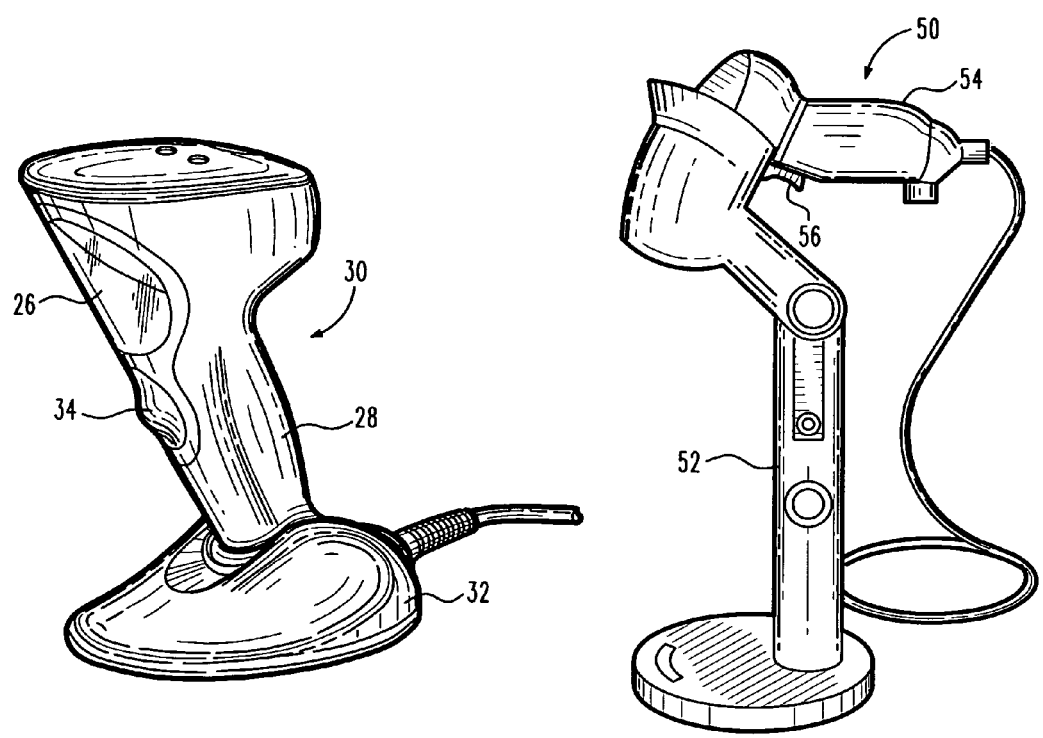
FIG. 2 is a perspective view of another portable imaging system operative in either a hand-held mode, or a workstation mode, for capturing light from targets to be electro-optically read.
FIG. 3 is a perspective view of still another portable imaging system operative in either a hand-held mode, or a workstation mode, for capturing light from targets to be electro-optically read.

Reference numeral 30 in FIG. 2 generally identifies another imaging system having a different configuration from that of imaging system 20. Imaging system 30 also has a generally vertical or upright window 26 and a gun-shaped housing 28 supported by a base 32 for supporting the imaging system 30 on a countertop. The imaging system 30 can thus be used as a stationary workstation in which products are slid or swiped past, or presented to, the vertical window 26, or can be picked up off the countertop and held in the operator's hand and used as a handheld imaging system in which a trigger 34 is manually depressed to initiate imaging of a target. In another variation, the base 32 can be omitted.

Reference numeral 50 in FIG. 3 generally identifies another portable, electro-optical imaging system having yet another operational configuration from that of imaging systems 20, 30. System 50 has a window and a gun-shaped housing 54 and is shown supported in a workstation mode by a stand 52 on a countertop. The system 50 can thus be used as a stationary workstation in which products are slid or swiped past its window, or can be picked up off the stand and held in the operator's hand in a handheld mode and used as a handheld system in which a trigger 56 is manually depressed to initiate reading of the symbol.

Figure 4:
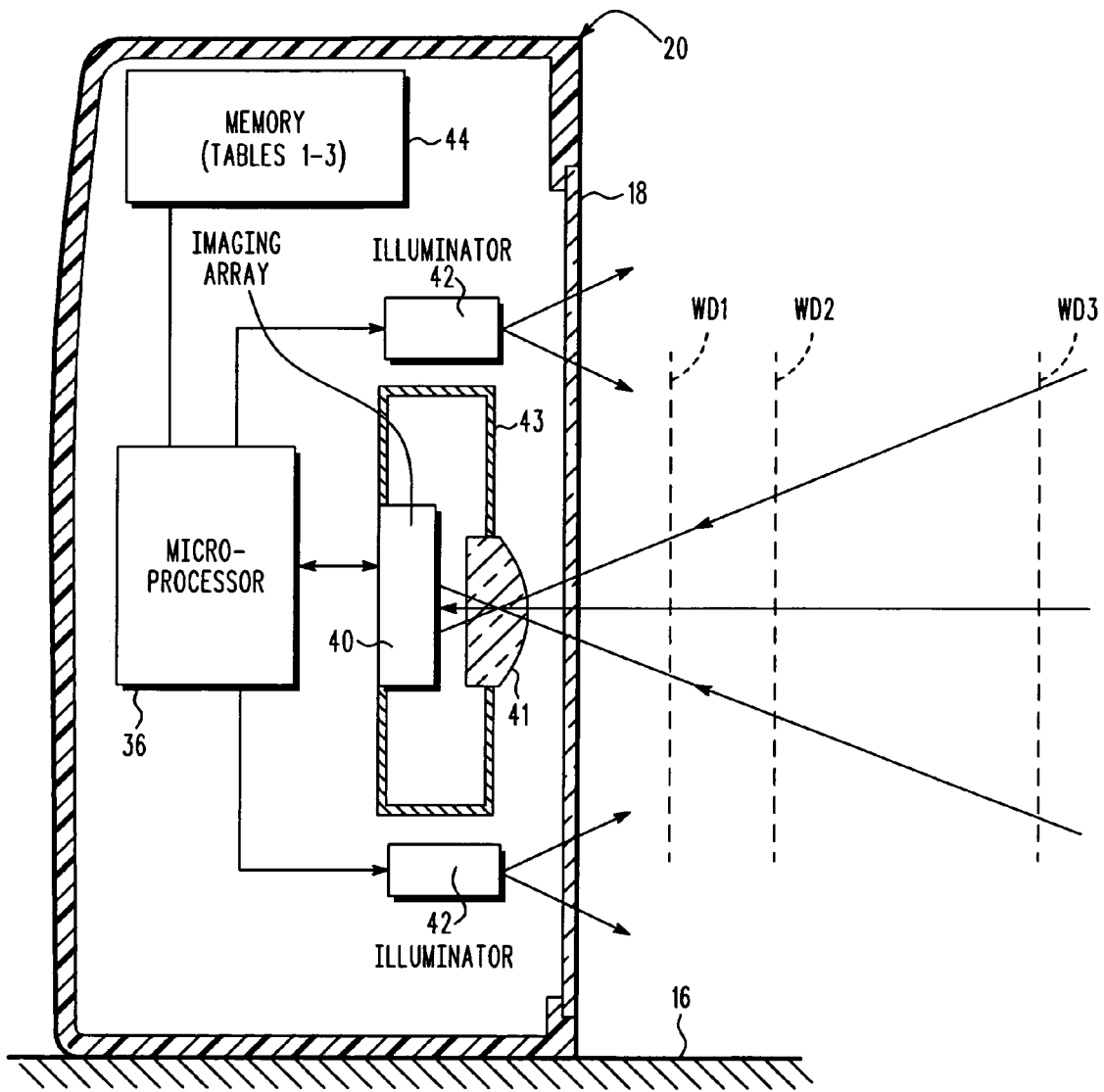
FIG. 4 is a schematic diagram of various components of the system of FIG. 1 in accordance with the present invention.
Figure 5:
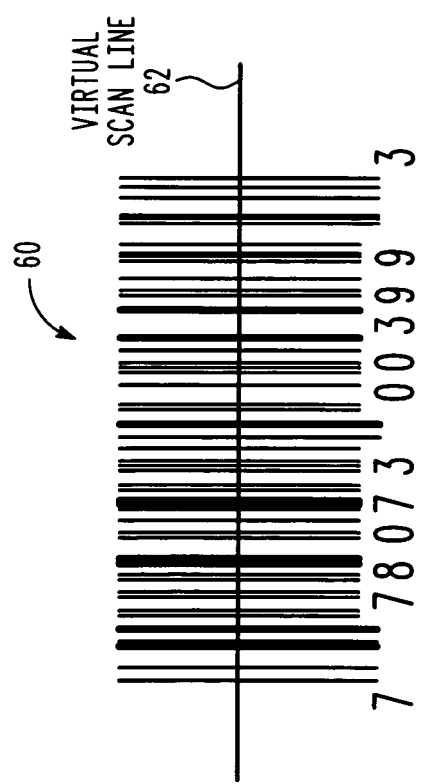
FIG. 5 is a front view of a symbol to be read by the systems of FIGS. 1-3 with a virtual scan line thereon.

Each system 20, 30, 50 includes, as shown for representative system 20 in FIG. 4, an imager 40 and a focusing lens assembly 41 that are mounted in an enclosure 43. The imager 40 is a solid-state device, for example, a CCD or a CMOS imager and has a linear or area array of addressable image sensors or pixels operative for capturing light through the window 18 from a target, for example, a one-dimensional UPC symbol 60 (see FIG. 5), over a field of view and located in a working range of distances between a close-in working distance (WD1), an intermediate working distance (WD2) and a far-out working distance (WD3)). In a preferred embodiment, WD1 is about two inches from the window 18, WD2 is about six inches from the window 18, and WD3 is over twelve inches from the window 18. Other numerical values for these distances are contemplated by this invention.

An illuminator is also mounted in the imaging system and preferably includes a plurality of light sources, e.g., light emitting diodes (LEDs) 42, arranged to uniformly illuminate the symbol 60. As shown in FIG. 4, the imager 40 and the illuminator LEDs 42 are operatively connected to a controller or microprocessor 36 operative for controlling the operation of these components. Preferably, the microprocessor 36 is the same as the one used for decoding light scattered from the target symbols and for processing the captured target images.

In operation, the microprocessor 36 sends a command signal to pulse the illuminator LEDs 42 for a short time period, say 500 microseconds or less, and energizes the imager 40 to collect light from a target only during said time period. A typical array needs about 16 to 33 milliseconds to acquire the entire target image and operates at a frame rate of about 30 to 60 frames per second. The array may have on the order of one million addressable image sensors. Frequently, the illuminator LEDs 42 are pulsed for a few milliseconds, especially when working at extended ranges where it is difficult to illuminate the symbol target as brightly. Under these circumstances, the illumination may be activated for up to around 30 ms.

As described above, in the handheld mode of any of the systems 10, 30, 50, the working distance range is typically designed to be long, for instance, over one foot from the respective system. A long working distance range enables the operator 22 to read a symbol located on a product that is either far from the handheld system, for instance, on a remote shelf, or is either too big, or too heavy, or too inconvenient to be brought to the handheld system.

However, if such a system with a long working distance range is placed on the countertop 16 or on the support stand 52 for hands-free operation, then the system can unintentionally read symbols on products that happen to be in the field of view. For example, it is not uncommon for a consumer to simultaneously dump many products to be purchased on the countertop 16 in the retail point-of-sale environment 10, in which event, the system will at least try to read the symbols on all those products scattered around the countertop 16. Worse yet, the operator 22 will not know which of the symbols have been read.

In accordance with one aspect of this invention, the working distance range in such systems is restricted to a restricted zone in the hands-free mode of operation. For example, the working distance range can be limited to a near subzone between the window and WD1, or an intermediate subzone between the window and WD2. In this way, symbols located beyond WD2 are not read in the hands-free mode of operation.

For this purpose, a memory 44 is accessible to the controller 36, for storing in look-up tables (see Tables 1-3 set forth below) a known set of values of a plurality of optical characteristics of the symbol 60 when the symbol 60 lies in the restricted zone, i.e., the near subzone or the intermediate subzone, within the range of working distances. These optical characteristics, as detailed below, vary with working distance. After the symbol 60 has been successfully decoded, the controller 36 is operative for processing the plurality of optical characteristics of the decoded symbol, and for determining that the decoded symbol has been successfully read within the restricted zone when each processed optical characteristic lies within the known set of values stored by the memory 44.

One of the optical characteristics is a symbol element size characteristic. The ability of the array 40 to successfully decode a symbol is dependent upon blur and pixels per module (PPM). PPM refers to the number of pixels employed for imaging the smallest, that is, narrowest width element, i.e., module, of the symbol. For example, a PPM of 1 would indicate that the narrowest element of the symbol is being imaged by a single pixel of the imaging array 40, and a PPM of 2 would indicate that the narrowest element of the symbol is being imaged by two pixels of the imaging array 40, and so on. Advanced imaging systems are able to successfully read, that is, image and decode a symbol with a PPM as low as 0.7. The ability of an imaging system to successfully read a high density symbol increases as PPM increases. The controller 36 is operative, in processing the symbol element size characteristic, for estimating how many of the pixels in the array 40 capture the return light from a symbol element having the narrowest width dimension, i.e., the module.

Tables 1-3, set forth below, list the PPM as a function of working distance for three different densities of UPC symbols. As the working distance from the system increases, the number of the pixels that capture the return light from the module, i.e., the PPM, decreases. Thus, knowing the PPM is an indicator of working distance, and can be used in restricting the working distance range. However, relying on just the PPM characteristic alone is not enough to insure that the symbol is at a certain distance, primarily because successive symbols being presented may be, and often are, of different densities, and therefore, there may be an overlap of PPM values for a first symbol of a first density at a first working distance and a second symbol of a second density at a second working distance.

Hence, another of the optical characteristics that is relied on is a contrast characteristic or modulation transfer function (MTF), which is analogous to a depth of modulation characteristic in moving laser beam scanners. One of the rows of pixels in tile imaging array 40 is exposed across the symbol 60 and, in effect, captures the return light over a virtual scan line 62 depicted in FIG. 5, and is analogous to a real scan line in moving laser beam scanners.

Figure 6:
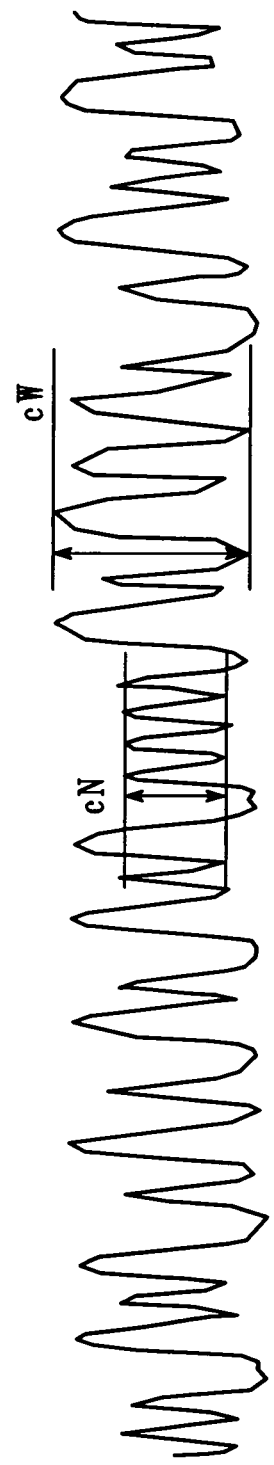
FIG. 6 is a signal waveform of an electrical signal produced by a detector assembly along the virtual scan line of FIG. 5.

The imaging array 40 generates an analog signal that may be exemplified by the signal waveform shown in FIG. 6. The parameter cN represents a first difference in brightness between adjacent symbol elements having the narrowest width dimension. The parameter cW represents a second difference in brightness between adjacent symbol elements having the widest width dimension. The controller 36 is operative, in processing the contrast characteristic, for estimating a contrast ratio of the first difference cN divided by the second difference cW and multiplying the result by the factor of 100.

Tables 1-3, set forth below, list the contrast ratio as a function of working distance for three different densities of UPC symbols. The contrast ratio is generally highest at an imaging plane at which the focusing lens assembly optimally focuses the return light onto the imager 40. The contrast ratio decreases in either direction away from the imaging plane.

After the symbol has been successfully decoded, the controller 36 is operative for determining that the decoded symbol has been successfully read within the near subzone when the PPM and the contrast ratio characteristics lie within the near set of values stored by the memory 44. For example, with reference to Tables 1-3, this occurs for the near subzone (less than or equal to 2 inches) when the PPM is greater than 6.43 and the contrast ratio is less than 67.92 (100% UPC), or when the PPM is greater than 5.28 and the contrast ratio is less than 50 (80% UPC), or when the PPM is greater than 3.86 and the contrast ratio is less than 28.57 (60% UPC).

After the symbol has been successfully decoded, the controller 36 is operative for determining that the decoded symbol has been successfully read within the intermediate subzone when the PPM and the contrast ratio characteristics lie within the intermediate set of values stored by the memory 44. For example, with reference to Tables 1-3, this occurs for the intermediate subzone (less than or equal to 6 inches) when the PPM is greater than 2.28 and the contrast ratio is greater than 59.62 (100% UPC), or when the PPM is greater than 1.83 and the contrast ratio is greater than 56 (80% UPC), or when the PPM is greater than 1.37 and the contrast ratio is less than 44.44 (60% UPC).

Thus, if the PPM and the contrast ratio characteristics both lie within their respective values for the respective subzones, then the controller 36 will accept the decoded symbol and send the results to a remote host for further processing. If either one of the PPM and the contrast ratio characteristics do not lie within their respective values for the respective subzones, then the controller 36 will discard the results. There are no value restrictions for the PPM and the contrast ratio characteristics for the far-out working distance WD3.

The controller 36 is further operative for distinguishing between a handheld mode and a hands-free mode of operation of the system. The system housing could be provided with a mechanical, optical, or magnetic switch, or an analogous mode switch or sensor, that is actuated when the housing is placed on the countertop 16 or the stand 52 to advise the controller 36 that hands-free operation is desired. The system housing could be provided with an orientation sensor for the same purpose. The controller 36 is operative for determining that the decoded symbol 60 has been successfully read within the restricted zone when each processed optical characteristic lies within the known set of values stored by the memory 44 in the hands-free mode of operation.

Figure 7:
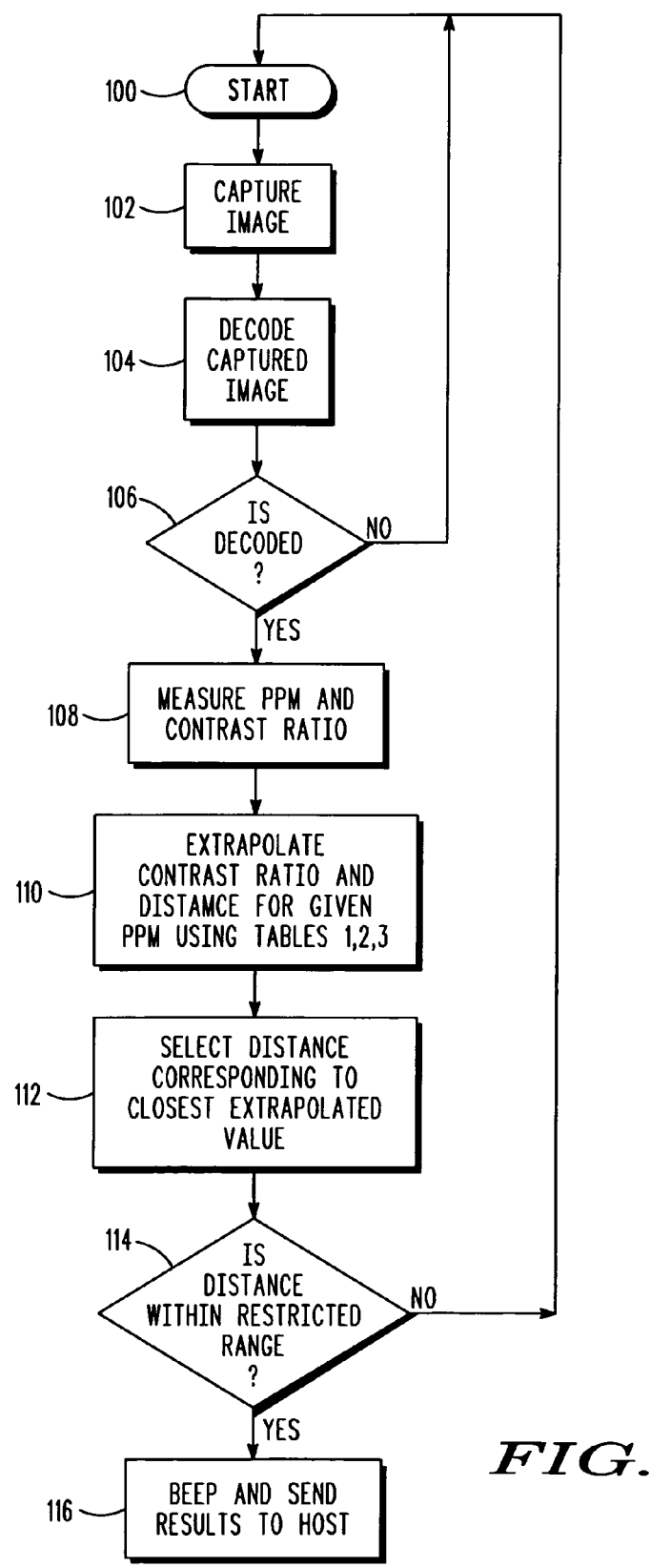
FIG. 7 is a flow chart depicting operation of a method in accordance with the present invention.

FIG. 7 is a flow chart summarizing the above. Starting from start block 100, the image of the symbol is captured at block 102, and decoded by the controller 36 at block 104. If not decoded at block 106, then the controller 36 returns to the start block 100 to await another symbol. If the symbol is successfully decoded, then the controller proceeds to evaluating whether the PPM and the contrast ratio lie within the range of values expected for the selected subzone. First, the PPM and the contrast ratio are measured at block 108. In block 110, expected values of the contrast ratio and their corresponding distances are extrapolated from the Tables 1-3 for a given PPM for each density. In block 112, it is assessed which extrapolated dual are closest to the actual measured data, and the closest data set and its corresponding distance are selected. If the selected distance is within the restricted range (block 114), then the controller 36 accepts the decoded symbol and sends the result to a remote host for further processing at block 116. If the selected distance is not within the restricted range (block 114), then the controller 36 rejects the decoded symbol and returns to the start block 100 to await another symbol.

By way of non-limiting numerical example, after decoding a bar code symbol, the optical characteristics were measured as: PPM=2.0 and contrast ratio=62%. By linear extrapolation of data from Table 1, it can be inferred that a 100% UPC symbol would yield a value of PPM=2.0, at a distance of approximately 6.8 inches, and a contrast ratio of 53%. For an 80% UPC symbol by extrapolation of data from Table 2, the extrapolated distance is 5.5 inches, and the contrast ratio is 64%. For a 60% UPC symbol, by extrapolation of data from Table 3, the extrapolated distance is 4.2 inches and the contrast ratio is 44%. The contrast value obtained for the 80% UPC symbol (64%) is closest to the actual measured contrast ratio of 62% and, hence, the expected working distance would be assessed to be 5.5 inches.

TABLE 1

100% UPC (13 mil)

| Distance (inches) | PPM | Contrast Ratio |
|---|---|---|
| 12 | 1.17 | 18.60 |
| 11 | 1.27 | 25.00 |
| 10 | 1.39 | 22.73 |
| 9 | 1.53 | 36.96 |
| 8 | 1.73 | 53.19 |
| 7 | 1.96 | 51.06 |
| 6 | 2.28 | 59.62 |
| 5 | 2.74 | 66.07 |
| 4 | 3.36 | 75.00 |
| 3 | 4.46 | 69.23 |
| 2 | 6.43 | 67.92 |

TABLE 2

80% UPC (10.4 mil)

| Distance (inches) | PPM | Contrast Ratio |
|---|---|---|
| 12 | 0.94 | 0.00 |
| 11 | 1.02 | 0.00 |
| 10 | 1.12 | 0.00 |
| 9 | 1.24 | 22.00 |
| 8 | 1.39 | 22.00 |
| 7 | 1.59 | 38.00 |
| 6 | 1.83 | 56.00 |
| 5 | 2.20 | 68.00 |
| 4 | 2.73 | 62.00 |
| 3 | 3.57 | 62.00 |
| 2 | 5.28 | 50.00 |

TABLE 3

60% UPC (7.8 mil)

| Distance (inches) | PPM | Contrast Ratio |
|---|---|---|
| 12 | 0.71 | 0.00 |
| 11 | 0.77 | 0.00 |
| 10 | 0.84 | 5.00 |
| 9 | 0.94 | 21.05 |
| 8 | 1.04 | 21.43 |
| 7 | 1.18 | 45.45 |
| 6 | 1.37 | 44.44 |

TABLE 3-continued

60% UPC (7.8 mil)

| Distance (inches) | PPM | Contrast Ratio |
|---|---|---|
| 5 | 1.64 | 43.92 |
| 4 | 2.05 | 43.75 |
| 3 | 2.71 | 37.25 |
| 2 | 3.86 | 28.57 |

It will be understood that each of the elements described above, or two or more together, also may find a useful application in other types of constructions differing from the types described above. Thus, imaging systems having different configurations can be used. In the preferred embodiment, the imaging systems are mounted in handheld housings. Also, the same reasoning can be applied for symbologies other than UPC symbols. Restricted zones of different numerical ranges could be employed.

While the invention has been illustrated and described as selective range restriction in an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An imaging system for electro-optically reading a symbol located within a range of working distances from the system, the symbol having a plurality of optical characteristics that vary with working distance, comprising:
a solid-state imager having an array of image sensors for capturing return light from the symbol over a field of view, and for generating an electrical signal indicative of the captured return light;
a controller operative for decoding the electrical signal into data indicative of the symbol, and for determining that the symbol has been successfully decoded;
a memory for storing a known set of values of the plurality of optical characteristics including a symbol element size characteristic and a symbol contrast characteristic of the symbol when the symbol lies in a restricted zone within the range of working distances;
the controller being further operative, after the symbol has been successfully decoded, for processing at least the symbol element size characteristic and the symbol contrast characteristic from the plurality of optical characteristics of the decoded symbol, and for determining that the decoded symbol has been successfully read within the restricted zone when each processed optical characteristic lies within the known set of values stored by the memory; and
wherein the controller is operative, in processing the symbol contrast characteristic for estimating a contrast ratio of a first difference in brightness between symbol elements having the narrowest width dimension divided by a second difference in brightness between symbol elements having the widest width dimension.

2. The system of claim 1, wherein the symbol has elements of different light reflectivity, and of different width dimensions, along a scan direction; and wherein the controller is operative, in processing the symbol element size characteristic, for estimating how many of the sensors in the array capture the return light from a symbol element having the narrowest width dimension.

3. An imaging system for electro-optically reading a symbol located within a range of working distances from the system, the symbol having a plurality of optical characteristics that vary with working distance, comprising:
a solid-state imager having an array of image sensors for capturing return light from the symbol over a field of view, and for generating an electrical signal indicative of the captured return light;
a controller operative for decoding the electrical signal into data indicative of the symbol, and for determining that the symbol has been successfully decoded; and
a memory for storing a known set of values of the plurality of optical characteristics of the symbol when the symbol lies in a restricted zone within the range of working distances, and the controller being further operative, after the symbol has been successfully decoded, for processing the plurality of optical characteristics of the decoded symbol, and for determining that the decoded symbol has been successfully read within the restricted zone when each processed optical characteristic lies within the known set of values stored by the memory and further wherein the controller is operative, in processing one of the plurality of the optical characteristics as a symbol element size characteristic, for estimating how many of the sensors in the array capture the return light from a symbol element having the narrowest width dimension and another one of the plurality of the optical characteristics as a symbol contrast characteristic, for estimating a contrast ratio of a first difference in brightness between symbol elements having the narrowest width dimension divided by a second difference in brightness between symbol elements having the widest width dimension.

4. The system of claim 3, wherein the restricted zone has a near subzone and an intermediate subzone; wherein the memory is operative for storing a near set of values for both the size characteristic and the contrast characteristic for the near subzone, and an intermediate set of values for both the size characteristic and the contrast characteristic for the intermediate subzone; and wherein the controller is operative, after the symbol has been successfully decoded, for determining that the decoded symbol has been successfully read within the near subzone when the size and contrast characteristics lie within the near set of values stored by the memory, and for determining that the decoded symbol has been successfully read within the intermediate subzone when the size and contrast characteristics lie within the intermediate set of values stored by the memory.

5. The system of claim 4, and a housing having a window through which the return light passes, wherein the near subzone lies between the window and a working distance of about two inches from the window, and wherein the intermediate subzone lies between the window and a working distance of about six inches from the window.

6. The system of claim 1, wherein the controller is further operative for distinguishing between a handheld mode and a hands-free mode of operation of the system, and wherein the controller is operative for determining that the decoded symbol has been successfully read within the restricted zone when each processed optical characteristic lies within the known set of values stored by the memory in the hands-free mode of operation.

7. A method of electro-optically reading a symbol located within a range of working distances from a system, the symbol having a plurality of optical characteristics that vary with working distance, comprising:
capturing return light from the symbol over a field of view of a solid-state imager having an array of image sensors;
generating an electrical signal indicative of the captured return light;
decoding the electrical signal into data indicative of the symbol;
determining that the symbol has been successfully decoded;
storing a known set of values of the plurality of optical characteristics including a symbol element size characteristic and a symbol contrast characteristic of the symbol when the symbol lies in a restricted zone within the range of working distances;
processing at least the symbol element size characteristic and the symbol contrast characteristic from the plurality of optical characteristics of the symbol after the symbol has been successfully decoded;
determining that the decoded symbol has been successfully read within the restricted zone when each processed optical characteristic lies within the stored known set of values; and
wherein the controller is operative, in processing the symbol contrast characteristic for estimating a contrast ratio of a first difference in brightness between symbol elements having the narrowest width dimension divided by a second difference in brightness between symbol elements having the widest width dimension.

8. The method of claim 7, and configuring the symbol with elements of different light reflectivity, and of different width dimensions, along a scan direction; and wherein the processing step is performed by processing the symbol element size characteristic by estimating how many of the sensors in the array capture the return light from a symbol element having the narrowest width dimension.

9. A method of electro-optically reading a symbol located within a range of working distances from a system, the symbol having a plurality of optical characteristics that vary with working distance, comprising:
capturing return light from the symbol over a field of view of a solid-state imager having an array of image sensors;
generating an electrical signal indicative of the captured return light;
decoding the electrical signal into data indicative of the symbol;
determining that the symbol has been successfully decoded;
storing a known set of values of the plurality of optical characteristics of the symbol when the symbol lies in a restricted zone within the range of working distances;
processing the plurality of optical characteristics of the symbol after the symbol has been successfully decoded, wherein the processing step is further performed by processing one of the plurality of the optical characteristics as a symbol element size characteristic, for estimating how many of the sensors in the array capture the return light from a symbol element having the narrowest width dimension and another one of the plurality of the optical characteristics as a symbol contrast characteristic by estimating a contrast ratio of a first difference in brightness between symbol elements having the narrowest width dimension divided by a second difference in brightness between symbol elements having the widest width dimension.

10. The method of claim 9, and configuring the restricted zone with a near subzone and an intermediate subzone; wherein the storing step is performed by storing a near set of values for both the size characteristic and the contrast characteristic for the near subzone, and an intermediate set of values for both the size characteristic and the contrast characteristic for the intermediate subzone; and, after the symbol has been successfully decoded, determining that the decoded symbol has been successfully read within the near subzone when the size and contrast characteristics lie within the stored near set of values, and determining that the decoded symbol has been successfully read within the intermediate subzone when the size and contrast characteristics lie within the stored intermediate set of values.

11. The method of claim 10, and passing the return light through a window of a housing, and configuring the near subzone to lie between the window and a working distance of about two inches from the window, and configuring the intermediate subzone to lie between the window and a working distance of about six inches from the window.

12. The method of claim 7, and distinguishing between a handheld mode and a hands-free mode of operation of the system, and determining that the decoded symbol has been successfully read within the restricted zone when each processed optical characteristic lies within the stored known set of values in the hands-free mode of operation.

* * * * *